United States Patent
Stosz et al.

(10) Patent No.: US 6,456,855 B1
(45) Date of Patent: Sep. 24, 2002

(54) METHOD AND APPARATUS FOR ESTABLISHING A GROUP CALL SESSION IN A COMMUNICATION SYSTEM

(75) Inventors: Jonathan David Stosz, Gilbert, AZ (US); Rhett Garrett Hayden, Scottsdale, AZ (US); Dean Paul Vanden Heuvel, Chandler, AZ (US); Charles Joseph Ganucheau, Jr., Mesa, AZ (US); Scott David Blanchard, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/650,386

(22) Filed: Aug. 29, 2000

(51) Int. Cl.[7] .................................................. H04B 7/00
(52) U.S. Cl. ...................... 455/518; 455/13.1; 455/519; 455/427
(58) Field of Search ................................ 455/12.1, 427, 455/430, 428, 13.1, 415, 414, 416, 429, 418, 518, 519; 370/261, 468, 522, 441, 331

(56) References Cited

U.S. PATENT DOCUMENTS

| | | | |
|---|---|---|---|
| 5,530,914 A | | 6/1996 | McPheters |
| 5,596,315 A | * | 1/1997 | Olds ........................... 340/7.2 |
| 5,717,830 A | | 2/1998 | Sigler et al. |
| 5,729,532 A | * | 3/1998 | Bales ........................... 370/261 |
| 5,781,860 A | * | 7/1998 | Lopponen .................... 455/426 |
| 5,914,958 A | * | 6/1999 | Chinitz ......................... 370/441 |
| 5,970,417 A | * | 10/1999 | Toyryla ....................... 455/519 |
| 6,112,085 A | * | 8/2000 | Garner ......................... 455/428 |
| 6,131,027 A | | 10/2000 | Armbruster et al. |
| 6,185,409 B1 | * | 2/2001 | Threadgill .................. 455/12.1 |
| 6,230,015 B1 | * | 5/2001 | Kinnunen .................... 455/450 |

* cited by examiner

Primary Examiner—Vivian Chin
Assistant Examiner—John J Lee
(74) Attorney, Agent, or Firm—Frank J. Bogacz

(57) ABSTRACT

A communication system (10) includes a group call controller (GCC) (26) for use in establishing, maintaining, and controlling the provision of group call services within the communication system (10). To initiate a group call session for a particular subscriber group, a group call request is delivered to the GCC (26) that identifies the desired group. Upon receipt of the request, the GCC (26) coordinates the delivery of group call notification to the members of the identified group to notify the members of the initiation of the group call session and to identify to the members a physical communication channel (36) to be used by each member to participate in the group call. Upon receipt of the notification, the group members each tune to a corresponding physical communication channel (36) and are immediately made part of the group call. The group members are not required to make any transmissions on the physical channel (36) to participate in the group call.

19 Claims, 4 Drawing Sheets

“METHOD AND APPARATUS FOR
ESTABLISHING A GROUP CALL SESSION
IN A COMMUNICATION SYSTEM

FIELD OF THE INVENTION

The invention relates generally to communication systems and, more particularly, to techniques for providing group services in a communication system.

BACKGROUND OF THE INVENTION

Some modern communication systems are making group call services available to subscribers. Typically, a "group call" will involve a predefined group of subscribers that are each given the opportunity to be made part of a common communication connection. Each group member that participates in the group call is able to monitor the transmissions of all other participating group members and to make their own transmissions that can be heard by all other participating group members. To offer quality group call services in a communication system, a procedure needs to be devised for establishing a group call session within the system. As can be appreciated, the procedure for establishing a group call session should be a relatively rapid process that does not involve undue delay. In addition, the procedure should not make inefficient use of system resources. Furthermore, the procedure should not involve an excessive consumption of power by the individual subscriber transceiver units, which are often battery powered.

Therefore, there is a need for a method and apparatus for efficiently and rapidly establishing a group call session in a communication system offering group services.

DETAILED DESCRIPTION OF A PREFERRED
EMBODIMENT

The present invention relates to a system for efficiently and rapidly establishing a group call session within a communication system. When a request is received to initiate a group call session for a predetermined subscriber group, the system first determines the locations of the members of the identified group within the system. The system then determines a physical communication channel to be used by each group member during the group call. The system then sends notification to each of the group members indicating that a group call has been initiated for the group and identifying a physical channel that is to be used by that group member to participate in the group call. Upon receiving the notification, the group members each tune to the identified physical channel and are instantly considered part of the group call. The group members are not required to transmit signals within the identified physical channel to participate in the group call.

Because the group members do not have to transmit a signal to be made part of the group call, the call can be established in a relatively short time span and the subscribers' transceiver units can conserve the energy that they would otherwise have to expend to transmit a signal. In addition, because notification is used, the communication system can conserve energy and make efficient use of system resources because the system does not have to maintain a constant group channel during periods when group activity is not anticipated. The inventive principles can be used in virtually any form of communication system that is to provide group services. The inventive principles are particularly beneficial when providing group services within a satellite communication system.

Figure 1:
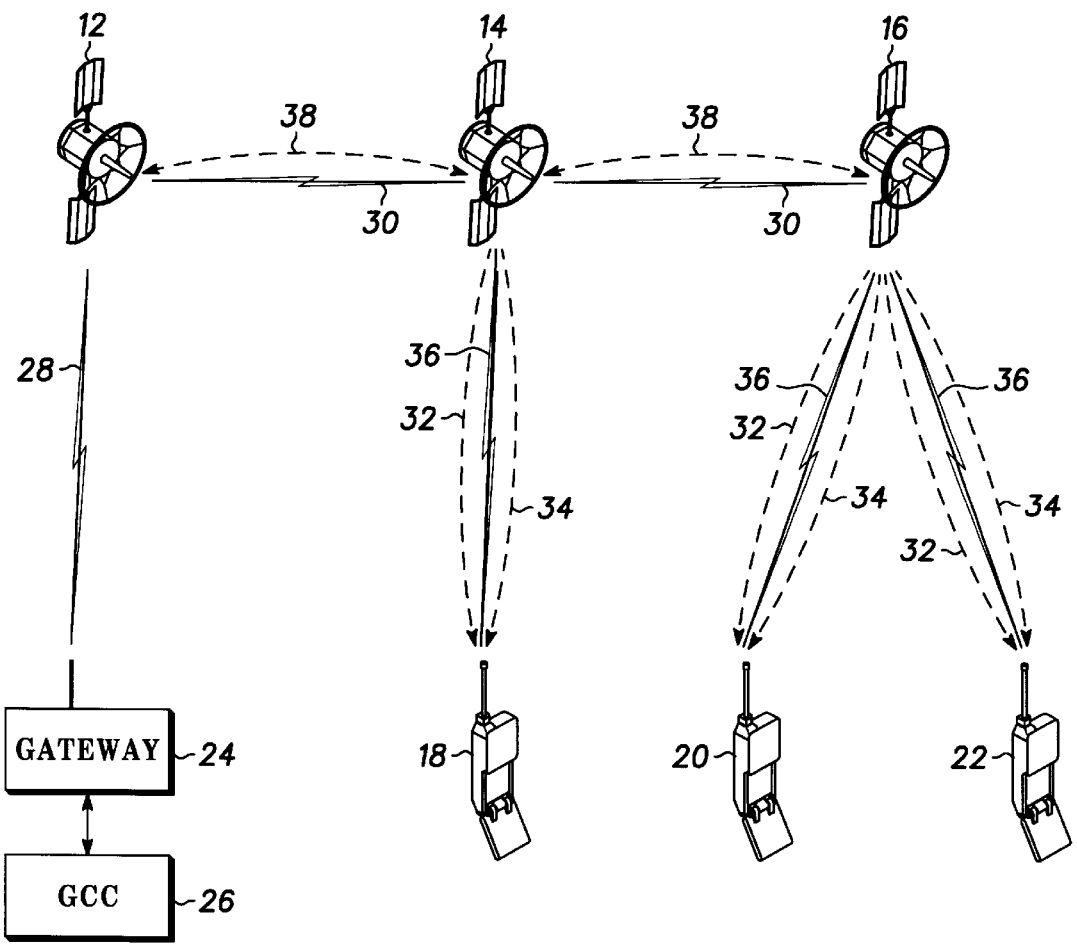
FIG. 1 is a block diagram illustrating a satellite communication system in accordance with one embodiment of the present invention.

FIG. 1 is a diagram illustrating a portion of a satellite communication system in accordance with one embodiment of the present invention. As illustrated, the satellite communication system 10 includes a plurality of space vehicles (SVs) 12, 14, 16 that orbit about the earth within predetermined orbital planes. Although three SVs are illustrated in FIG. 1, it should be appreciated that a satellite communication system can include anywhere from one to a relatively large number of space vehicles. The SVs 12, 14, 16 act as nodes within a large communication network through which communication messages can be routed. Each SV 12, 14, 16 includes at least one wireless ground transceiver that allows the SV to maintain a two-way communication link 36 with one or more subscribers within the coverage region of the SV (e.g., terrestrial subscribers 18, 20, and 22 illustrated in FIG. 1). Each SV 12, 14, 16 also includes at least one inter-satellite transceiver for supporting an inter-satellite link (ISL) 30 with another satellite within the system 10.

As illustrated in FIG. 1, the satellite communication system 10 also includes a satellite gateway 24 for providing access to the satellite system 10 for users within an external communication network such as, for example, a public switched telephone network (PSTN). The satellite gateway 24 will maintain one or more two-way communication links 28 with at least one of the SVs in the constellation. A group call controller (GCC) 26 is also provided for use in establishing, maintaining, and controlling the provision of group call services within the communication system 10. In the illustrated embodiment, the GCC 26 operates through the gateway 24 to provide group call services within the system 10. It should be appreciated that the GCC 26 can be located virtually anywhere within the communications system 10 in accordance with the present invention, including a location within the gateway 24, within one of the SVs 12, 14, 16, or within a dedicated GCC facility coupled to the SVs via a direct two-way wireless link.

In a typical implementation, each of the SVs 12, 14, 16 in the satellite communication system 10 maintains a number of independent antenna beams for providing communication services to subscribers. The antenna beams associated with a particular SV collectively define a "coverage region" of the SV, which is the overall area serviced by that SV. A subscriber (e.g., terrestrial subscriber 20) that wishes to establish a connection through the system 10 will therefore be serviced by the particular SV and beam currently covering the subscriber's present location. Because the SVs 12, 14, 16 are typically moving with respect to the subscribers (and the earth's surface), the SV and beam that is currently servicing a particular subscriber can change with time. That is, SV and beam "handoffs" can occur during the duration of a communications connection through the system 10. In a system that uses one or more SVs in geosynchronous (i.e., geostationary) orbit, the SVs do not move with respect to the earth's surface. However, a mobile subscriber in such a system can still require handoffs between individual beams and/or SVs.

Each of the beams generated by an SV in the system 10 is typically capable of maintaining a plurality of independent two-way communication channels 36 with subscribers within the beam footprint. Any of a number of different multiple access schemes can be used for providing these different channels including frequency division multiple access (FDMA), time division multiple access (TDMA), code division multiple access (CDMA), or any combination of these techniques. The SVs keep track of which subscribers are currently using each physical communication channel at any particular time. As described above, because the SVs are usually moving with respect to the subscribers, the beam servicing a subscriber can change during a call. Consequently, the physical communication channel servicing the subscriber can also change during the call.

Each of the SVs in a satellite communication system generally maintains one or more signaling channels for providing signaling and control functions with respect to the subscribers. In the illustrated embodiment, each SV maintains a ring channel (RCH) 32 for providing ring messages to the subscribers within the coverage region of the SV and a plurality of broadcast control channels (BCCHs) 34 for providing control information to the subscribers within the coverage region. The ring channel 32 and each broadcast control channel 34 are typically fixed-frequency simplex channels that provide signals to all subscribers within the coverage region of the SV. Each broadcast control channel 34 is usually continuously active while the ring channel 32 is more bursty in nature. For example, in one embodiment, the ring channel 32 transmits every fourth time slot while the broadcast control channel 34 transmits every time slot. The ring channel 32, however, is typically a higher power channel than the broadcast control channel 34. As illustrated in FIG. 1, inter-satellite ring channels 38 exist between the SVs 12, 14, 16.

As described above, the GCC 26 is operative for establishing, maintaining, and controlling the provision of group call services within the communication system 10. Subscriber groups are typically activated by sending a request to the GCC 26 indicating a desire to setup a subscriber group that includes a particular group of subscribers. The GCC 26 then assigns a group identification number (GID) to the requested group and records the corresponding subscriber information in association therewith. The GID is then preferably delivered to each of the indicated group members who record the information for later use (i.e., the subscribers each know which group(s) they are in).

Subscriber groups can be specified in any of a number of different ways. For example, in one approach, a subscriber group will include all of the subscribers within the satellite communication system 10 that are currently located within a predetermined region (e.g., the state of Arizona). In another approach, a subscriber group will include a plurality of identified subscribers who can be either stationary or mobile. If mobile subscribers are associated with a group, some form of location tracking can be used to keep track of the location of the mobile group members at any particular time. This location tracking can include a requirement that the mobile group members periodically register with the GCC 26 when they travel outside a base region.

Figure 2:
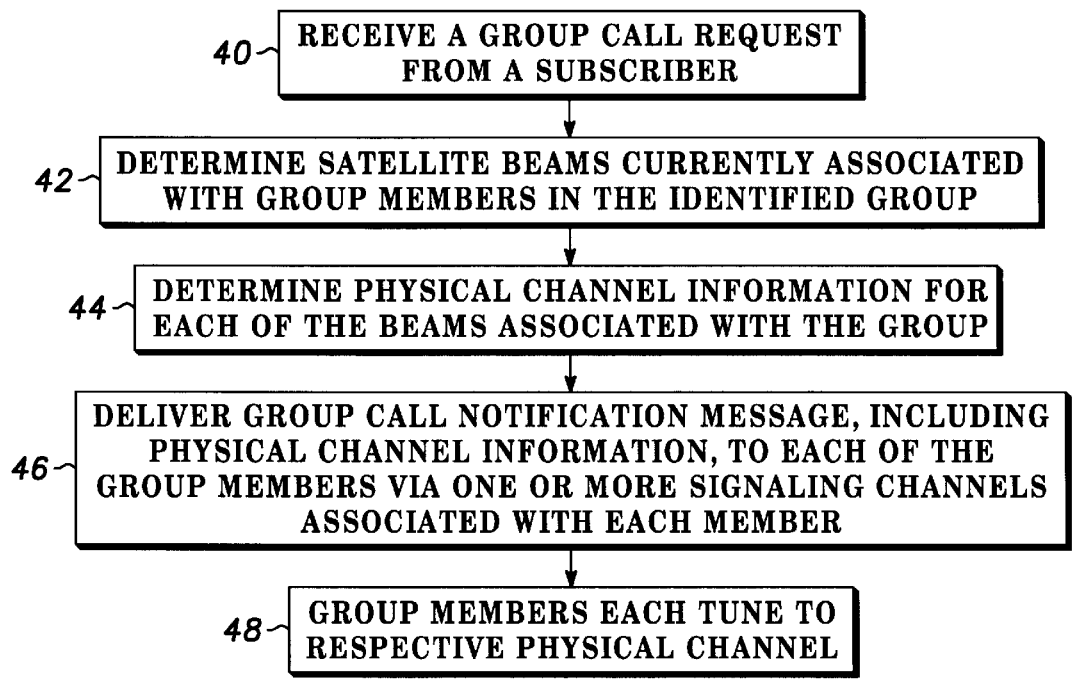
FIG. 2 is a flowchart illustrating a method for establishing a group call session within the communication system of FIG. 1 in accordance with one embodiment of the present invention.

FIG. 2 is a flowchart illustrating a method for establishing a group call within the communication system 10 of FIG. 1 in accordance with one embodiment of the present invention. It should be appreciated that the method illustrated in FIG. 2 can be adapted for use in virtually any form of communication system for use in providing group call services within that system. First, a group call request is received at the GCC 26 from one of the subscribers within the system 10 requesting that a group call be initiated for an identified group (step 40). The group call request will typically include the GID of the desired group. In response to the request, the GCC 26 determines the satellite beams within which the subscribers in the identified group are currently located (step 42). In a preferred approach, the GCC 26 will maintain and continuously update an individual list of beams associated with the group members of each group. For example, if a group comprises all subscribers within a particular geographic region, the list of beams will be continuously updated to include all beams that are currently covering that geographic region. If a group comprises a plurality of identified subscribers, the list of beams will be continuously updated to include all beams that are currently covering the locations of those subscribers.

Next, physical channel information is determined for each of the beams associated with the identified group (step 44). The physical channel information will identify the actual communication channel within the beam that will be used by group members within the beam to participate in the group call. The physical channel information will typically take the form of a physical channel number (PCN) that can identify, for example, a frequency band (e.g., if FDMA is being used), a time slot (e.g., if TDMA is being used), a code (e.g., if CDMA is being used), or any combination thereof. As will be described in greater detail, a number of different techniques are available for acquiring the physical channel information for the different beams associated with the group.

After the physical channel information has been determined for each of the relevant beams, a group call notification message (or series of messages) is delivered to the group members indicating that a group call session has been initiated for the group and identifying the physical channel to be used for each beam (step 46). The notification message is delivered to the group members via one or more signaling channels within the system 10. In one approach, an individual notification message is delivered to each beam in the system 10 that includes at least one group member. Each of the group members within the beam then receive the notification message for that beam and tune to the indicated physical channel. In another approach, an individual notification message is delivered to each SV coverage region that includes at least one group member. In this approach, each of the group members within the coverage region receives the notification message for that coverage region and tunes to the indicated physical channel for the group member's beam. In yet another approach, a single notification message is sent to all of the group members at the same time. As will be apparent to persons of ordinary skill in the art, other approaches are also possible. The notification message will preferably include the GID of the associated group. As described previously, in the illustrated embodiment, both a ring channel 32 and multiple broadcast control channels 34 are available within each SV for performing the notification messaging function. As will be described in greater detail, a number of different techniques are available for delivering notification to a group member using the corresponding ring channel 32 and/or broadcast control channels 34.

After a group member has received the appropriate physical channel information, the group member tunes to the identified physical channel and is immediately part of the group call (step 48). That is, the group member is not required to make any transmissions on the physical channel to be able to participate in the call. The satellite communication system 10 is correspondingly configured so that all of the physical channels associated with the group are coupled together into one large connection (known as the group channel) so that all participating group members can communicate with one another.

As described above, a number of different techniques are available for determining the physical channel information for each of the beams associated with an identified group. In a typical satellite communication system, the SVs each control the allocation of communication channels to subscribers currently within the coverage region of the SV. That is, for each beam, the SV assigns physical communication channels to individual subscribers within the beam footprint based on current resource availability, usually on a first come, first served basis. In accordance with one embodiment of the present invention, each SV in the system 10 will assign at least one physical channel to a subscriber group for each beam of the SV that includes at least one group member. The SV will also maintain and continuously update a table that maps each group (or GID) serviced by the SV to its corresponding physical channel(s) (or PCN(s)) within that SV.

In a satellite communication system, such as system 10 of FIG. 1, a logical channel number (LCN) is commonly assigned to each call currently set up within the system. The LCNs are typically maintained and tracked within a central location in the system, such as a gateway facility (e.g., gateway 24). The LCN associated with a call does not change during the duration of the call, even though the physical channels associated with the call can change based on the relative movement between the SVs and the subscribers, as described above. In accordance with one embodiment of the present invention, each SV will maintain and continuously update a table that maps each LCN currently serviced by the SV to its corresponding physical channel(s) within that SV.

Figure 3:
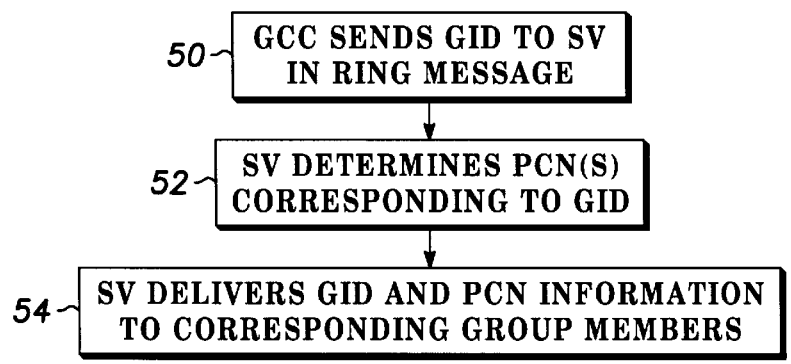
FIGS. 3, 4, and 5 are flowcharts illustrating various techniques for determining physical channel information for each beam within an SV that is currently servicing a group call in accordance with the present invention.
Figure 4:
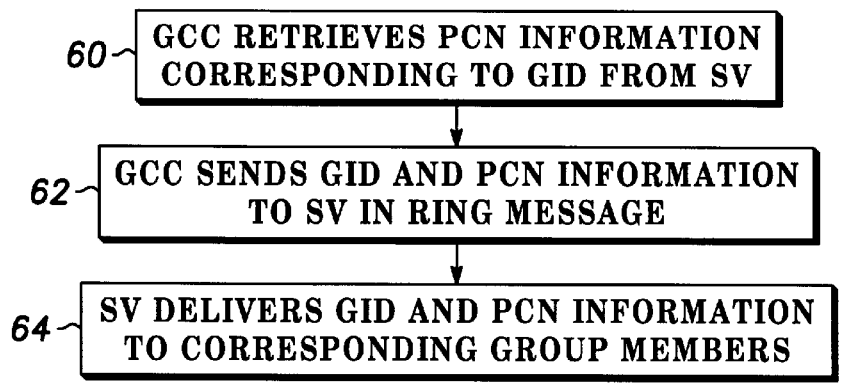
Figure 5:
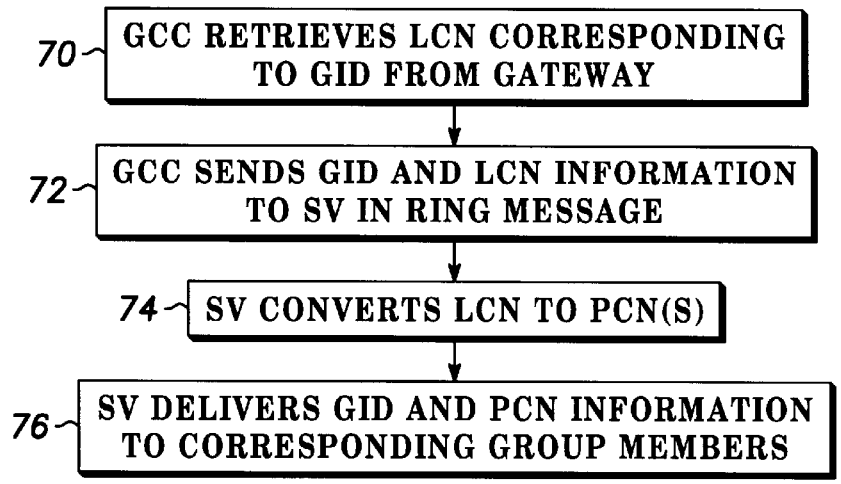

FIGS. 3, 4, and 5 are flowcharts illustrating various methods for determining physical channel information for each beam within an SV that is currently servicing a particular group call. The methods each need to be performed for each SV associated with the group call. As will be apparent to a person of ordinary skill in the art, other methods for determining physical channel information can also be employed in accordance with the present invention. The actual method that is used in any particular implementation of the invention will usually depend upon the specifics of the communication system in which the inventive principles are being practiced. Typically, a single physical channel will be assigned to service all group members within a particular beam. It should be appreciated, however, that embodiments that use multiple physical channels within a single beam to service multiple group members within that beam also exist.

In one technique for determining physical channel information, as illustrated in the flowchart of FIG. 3, the GCC 26 first sends the GID of the identified group (which it received as part of the group call request) to the relevant SV (step 50). The GID is delivered to the SV within a ring message via a path that can include one or more inter-satellite ring channels 38. After receiving the ring message, the SV determines the PCN(s) corresponding to the GID by referencing the appropriate mapping table (step 52). The SV then delivers the GID and associated PCN(s) to the corresponding group members (step 54).

In another technique for determining physical channel information, as illustrated in the flowchart of FIG. 4, the GCC 26 first retrieves the PCN information corresponding to the GID from the SV (step 60). The GCC 26 then formats a ring message with the GID and the PCN(s) and sends the message to the SV via a path that can include one or more inter-satellite ring channels 38 (step 62). After receiving the ring message, the SV delivers the GID and associated PCN(s) to the corresponding group members (step 64). In one approach, the SV simply directs the received ring message to the corresponding subscriber ring channel 32 for delivery to the group members.

In still another technique for determining physical channel information, as 15 illustrated in the flowchart of FIG. 5, the GCC 26 first retrieves the LCN corresponding to the group from the gateway 24 (or other similar facility) (step 70). The GCC 26 then formats a ring message with the GID and the LCN and sends the message to the SV (step 72). After receiving the ring message, the SV determines the PCN(s) corresponding to the identified LCN by referencing the appropriate mapping 20 table (step 74). The SV then delivers the GID and associated PCN(s) to the corresponding group members (step 76).

Figure 6:
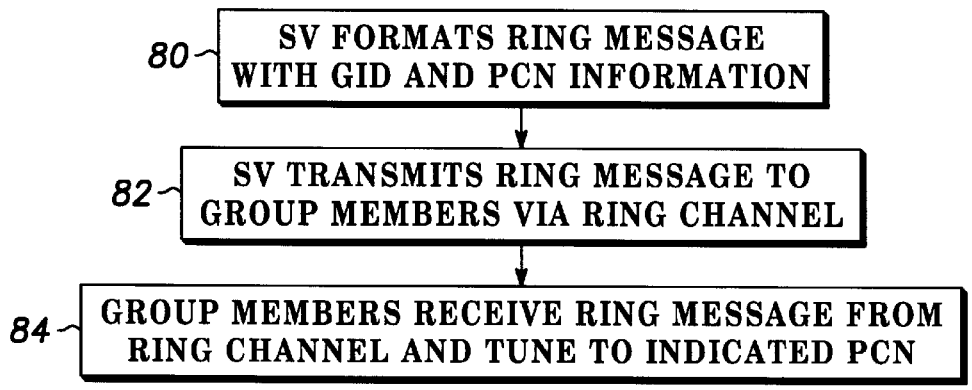
FIGS. 6, 7, and 8 are flowcharts illustrating various techniques for delivering a notification message from an SV to a group member using a ring channel and/or broadcast control channel in accordance the present invention.
Figure 7:
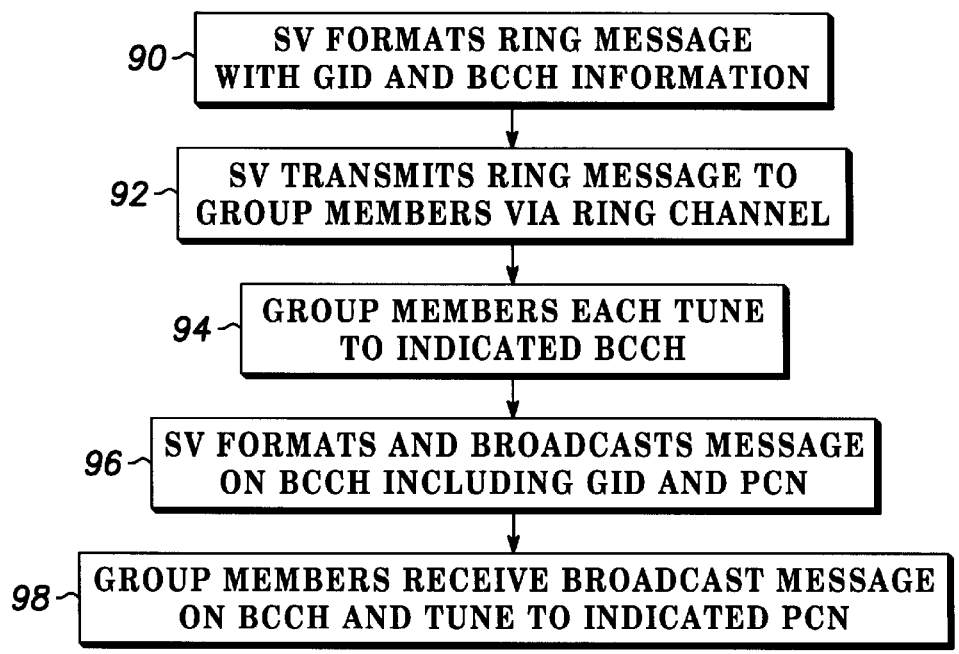
Figure 8:
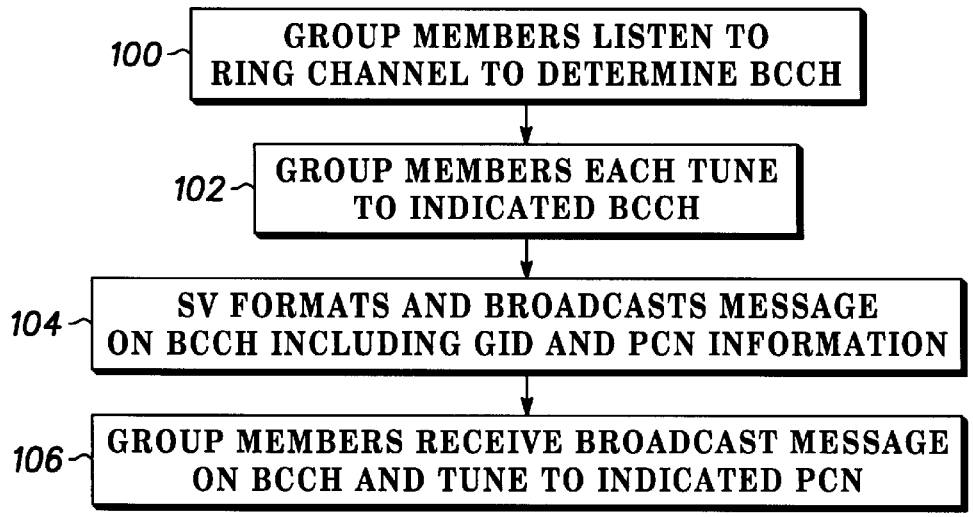

As discussed previously, a number of different techniques are available for delivering a notification message to group members associated with a particular SV using a corresponding ring channel 32 and/or broadcast control channel 34. FIGS. 6, 7, and 8 are flowcharts illustrating three of these methods. All of these methods assume that the physical channel information is already known at the relevant SV. Any one of these techniques can be used in connection with any one of the techniques for determining physical channel information described above.

In a first technique, illustrated in FIG. 6, the SV first formats a ring message including both the GID and the PCN information (step 80). The SV then transmits the ring message to the corresponding group member(s) via the ring channel 32 (step 82). The group members each receive the ring message from the ring channel and tune to the indicated PCN (step 84). In a preferred approach, the ring message will identify which PCN corresponds to which beam of the SV. The group members, each knowing the beam that they are currently being serviced by, tune to the corresponding PCN. As described above, in one embodiment of the invention, the ring channel 32 only transmits once every four time-slots. Thus, because of the possible delay in the delivery of the ring message on the ring channel 32, caution must be exercised to ensure that the PCN information that is received by a group member is still valid at the time of receipt. This can be alleviated by predicting the time of receipt of the ring message by the subscriber and also predicting the PCN information that will be valid at that time. This predicted information is what is then included within the ring message.

In another technique, illustrated in FIG. 7, both the ring channel 32 and one of the broadcast control channels 34 are used to provide the group call notification. First, the SV formats a ring message including the GID and information identifying one of the broadcast control channels 34 that will be used to deliver further information (step 90). The SV then transmits the ring message to the corresponding group members via the ring channel 32 (step 92). The group members each receive the ring message and tune to the indicated BCCH (step 94). The SV contemporaneously formats and transmits a message on the indicated BCCH that includes both the GID and the PCN information (step 96). The group members each receive the message on the BCCH and tune to the indicated PCN (step 98).

In yet another technique, illustrated in FIG. 8, each group member associated with an SV monitors the corresponding ring channel to identify an appropriate BCCH (step 100). The group members then tune to the indicated BCCH (step 102). The SV then formats and transmits a broadcast message on the BCCH including both the GID and PCN information (step 104). The group member receives the broadcast message and tunes to the indicated PCN (step 106).

It should be appreciated that virtually any form of signaling channel can be used in accordance with the present invention to provide group call notification. The signaling channel type that is used in a particular case will generally depend upon the type of communication system implementing the inventive principles. In an alternative to the above-described satellite system signaling arrangement, for example, an individual ring channel and BCCH group can be provided for each beam of an SV. Notification messages are then delivered to group members within each associated beam via a corresponding ring channel and/or BCCH. As will be apparent to a person of ordinary skill in the art, many other signaling arrangements are also possible.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use in establishing a group call session in a communication system having a plurality of dynamic antenna beams with associated time varying channels providing communication services to a plurality of subscribers, said method comprising:
   receiving a request to initiate a group call session for group members within a first group of subscribers;
   determining dynamic antenna beams currently associated with group members in said first group of subscribers;
   determining physical communication channel information for each of said dynamic antenna beams associated with said group members;
   delivering said physical communication channel information to said plurality of subscribers via a signaling channel within the communication system; and
   tuning to the physical communication channel by a first group member whereby the first group member immediately becomes part of the group call without being required to make any transmissions to participate in the call.

2. The method claimed in claim 1, wherein said step of determining physical communication channel information includes continuously updating said physical communication channel to be used by each of said plurality of subscribers.

3. The method claimed in claim 1, wherein said step of delivering physical communication channel information includes delivering information via a ring channel within the communication system.

4. The method claimed in claim 1, wherein said step of delivering physical communication channel information includes delivering information via a broadcast control channel within the communication system.

5. The method claimed in claim 1, wherein said delivering step comprises:
   generating a ring message including a group identifier identifying said first group of subscribers and a physical channel identifier identifying a physical communication channel to be used by at least one group member; and
   transmitting said ring message to said at least one group member via a ring channel.

6. The method claimed in claim 1, wherein said delivering step comprises:
   generating a broadcast message including a group identifier identifying said first group of subscribers and a physical channel identifier identifying a physical communication channel to be used by at least one group member; and
   transmitting said broadcast message to said at least one group member via a broadcast channel.

7. The method claimed in claim 6 further comprising the step of receiving said broadcast message by at least one of said plurality of subscribers.

8. The method claimed in claim 6, wherein said delivering step comprises:
   generating a ring message including a group identifier identifying said first group of subscribers and a broadcast channel identifier identifying a broadcast channel to be used to transfer physical communication channel information to at least one group member;
   transmitting said ring message to said at least one group member via a ring channel;
   generating a broadcast message including said group identifier and a physical channel identifier identifying a physical communication channel to be used by said at least one group member; and
   transmitting said broadcast message on said identified broadcast channel.

9. The method claimed in claim 1, wherein said communication system is a satellite communication system; and
   said step of determining physical communication channel information comprises:
      identifying said plurality of dynamic antenna beams within said satellite communication system that currently include group members, each of said plurality of dynamic antenna beams including multiple physical communication channels; and
      allocating at least one physical communication channel within each of said plurality of dynamic antenna beams for use by group members within each beam.

10. The method claimed in claim 1, wherein said request to initiate a group call session is received from one of said plurality of subscribers.

11. A satellite communication system comprising:
   a plurality of space vehicles orbiting about a primary body and moving with respect to a surface of said primary body, each of the plurality of space vehicles containing a transceiver operable for communicating with another of the plurality of space vehicles; and
   a group call controller (GCC) for managing group services within the satellite communication system, said GCC comprising:
      an input for receiving a group call request requesting an initiation of a group call session for a predetermined subscriber group;

means for determining a space vehicle and associated satellite beam currently associated with a group member in said predetermined subscriber group;

means for determining a physical channel for each of said satellite beams associated with said predetermined subscriber group; and means for transmitting a message to said first space vehicle to initiate delivery of group call notification from said first space vehicle to said at least one member of said predetermined subscriber group.

12. The satellite communication system claimed in claim 11, wherein said means for transmitting a message transmits said message via a signaling channel.

13. The satellite communication system claimed in claim 11, wherein said first space vehicle includes means for delivering said group call notification from said first space vehicle to said at least one member of said predetermined subscriber group via at least one signaling channel.

14. The satellite communication system claimed in claim 11, wherein said group call notification includes a group identifier identifying said predetermined subscriber group and a physical channel identifier identifying a physical channel to be used by said at least one member of said predetermined subscriber group to participate in said group call session.

15. The satellite communication system claimed in claim 11 wherein said space vehicle acts as nodes within a large communication network through which communication messages can be routed.

16. A satellite communication system, comprising:

a plurality of space vehicles orbiting about a primary body and moving with respect to a surface of said primary body, each of said space vehicles having a plurality of antenna beams for communicating with subscribers, each of said plurality of space vehicles having a transceiver operable for communicating with another of the said plurality of space vehicles;

a receiver for receiving a group call request requesting an initiation of a group call session for an identified subscriber group within the satellite communication system;

means for determining space vehicles and associated antenna beams currently associated with group member in said predetermined subscriber group;

means for acquiring physical channel information associated with said antenna beams that identifies a physical channel to be used by said at least one member of said identified subscriber group to participate in said group call session; and means for notifying said at least one member of said identified subscriber group that a group call session has been initiated for said identified subscriber group, said means for notifying including means for delivering said physical channel information to said at least one member of said identified subscriber group.

17. The satellite communication system claimed in claim 16, wherein said means for notifying includes means for delivering at least one message from a space vehicle associated with said antenna beam to said at least one member of said identified subscriber group via at least one signaling channel.

18. The satellite communication system claimed in claim 17, wherein said at least one signaling channel includes at least one of the following: a ring channel and a broadcast control channel.

19. The satellite communication system claimed in claim 16, wherein said means for notifying includes means for delivering a message to said at least one member of said identified subscriber group, said message including a group identifier identifying said subscriber group.

* * * * *